March 19, 1929. A. K. PEHRSON 1,706,362

PASSAGEWAY DRIVE MECHANISM

Filed April 18, 1928

INVENTOR
Alfred K. Pehrson

Patented Mar. 19, 1929.

1,706,362

UNITED STATES PATENT OFFICE.

ALFRED K. PEHRSON, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

PASSAGEWAY DRIVE MECHANISM.

Application filed April 18, 1928. Serial No. 270,917.

This invention has for an object the proper maintenance of the openings in the passageway member of an articulated car unit, with respect to the openings in the two adjacent car bodies.

Another object of my invention is to provide means on each of the adjacent car body ends for controlling the movement of the passageway member between them by the movements of the bodies themselves.

Another object of my invention is the provision of means for controlling the passageway member of an articulated car unit, through movements of either one of the two adjacent car bodies.

Figure 1:
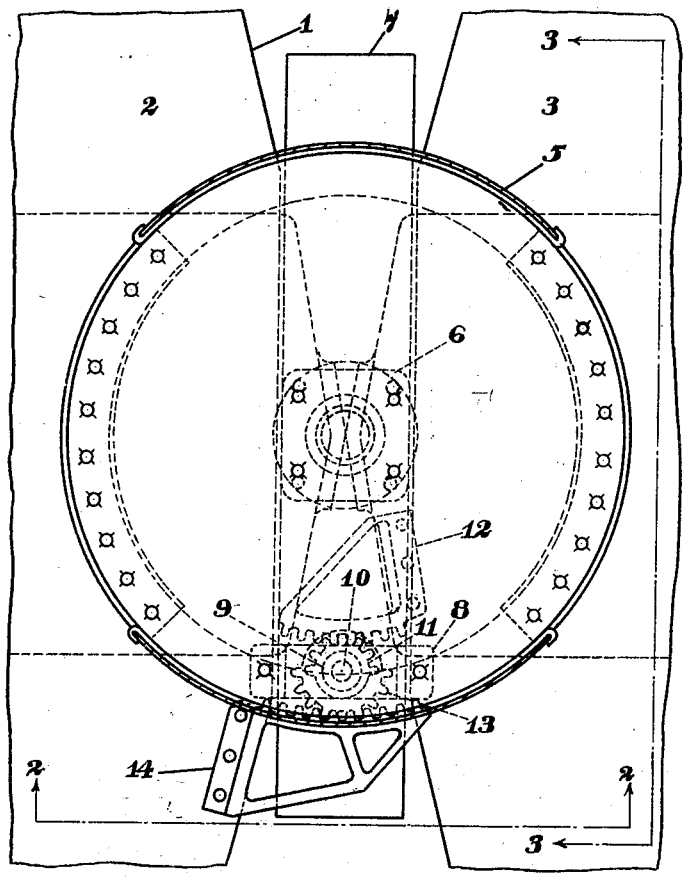
Figure 3:
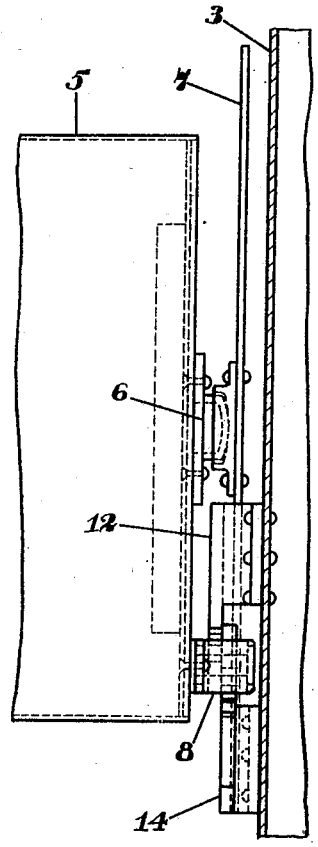
Figure 2:
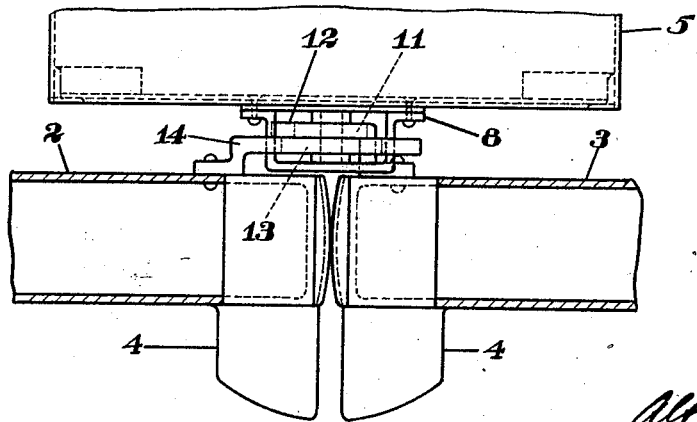

Referring now to the drawings, Fig. 1 is a plan view of a portion of an articulated car unit showing the passageway member between the two adjacent car bodies and the passageway drive mechanism; Fig. 2 is a view taken along the lines 2—2 of Fig. 1 and shows in elevation the passageway member and car bodies and the passageway drive mechanism with the upper portions of the car bodies removed; Fig. 3 is a view taken along the lines 3—3 of Fig. 1 with the upper portions of the car bodies removed.

Referring now in detail to the drawings where like reference characters refer to like parts, reference character 1 indicates an articulated car unit comprising bodies 2 and 3 supported by means of bearings 4 in a base contained on a common truck (not shown). A passageway member 5 is pivotally mounted in a base 6 attached to a bridge member 7 which is supported by a common truck, the design of the bridge member 7 and method of attaching same to the truck common to both bodies is not shown in detail in the drawings as any suitable construction may be used. Attached to the floor of the passageway member is a housing member 8 in which is mounted the pinion member 9 which controls the movement of the passageway member 5. This pinion member 9 is freely rotatable on a shaft 10 secured in the housing member. The upper portion 11 of the pinion is in engagement with a rack member 12 which is mounted on the body 3 and the lower portion 13 of the pinion is engaged by a rack member 14 which is mounted on the body 2.

When the articulated car unit is moving along a straight track, the engagement of the racks 12 and 14 with the pinion 9 maintains the passageway member in a fixed relation to the openings in the adjacent car bodies.

When either of the bodies 2 or 3 is turned as when the unit is traversing a curved portion of the track, the movement of the rack portion fixed to the turning car body will transmit a corresponding proportional movement to the passageway member 7 on its base 8. From an examination of the drawings and the foregoing description, it will be readily apparent that when one of the bodies, such as 3, is turned relative to the other body 2, the movement of the rack member 12 fixed to the car body 3 and in engagement with the portion 11 of the pinion 9, will cause the pinion 9 to turn, which turning will cause the pinion to move in a transverse direction along the stationary rack portion 14 fixed to the car body 2, and will move the passageway member with it. Due to the differences in the pitch diameters of the rack and pinion members, the passageway member will move a smaller amount than the car bodies and the openings in the passageway member will thus proportion this movement between the openings in the two car bodies.

When, however, the movement of both car bodies is such that the rack portions fixed thereto simultaneously move toward or away from each other a like amount, the corresponding movements between the rack portions secured to the car bodies and the pinion secured to the passageway member will cause the passageway member to maintain its original position and will again proportion the movement between the openings in the passageway member and of the car bodies.

From the above description, it will be readily apparent that by means of the described passageway drive mechanism, a free and uninterrupted passageway member is maintained between the two adjacent car bodies at all times irrespective of the movement of the car bodies with relation to each other.

Having thus described the invention what I claim as new and desire to secure by Letters Patent is:

1. In an articulated car unit, a passageway member between and extending into the adjacent car bodies, a passageway drive mechanism, said mechanism comprising fixed rack members mounted on the adjacent ends of the adjacent car bodies, engaging a pinion member rotatably mounted on said passageway member.

2. In an articulated car unit, a passageway member pivotally mounted between the adjacent car bodies, a passageway drive mechanism, said mechanism comprising fixed rack members mounted on the adjacent ends of the adjacent car bodies, engaging a pinion member rotatably mounted on said passageway member.

3. In an articulated car unit, a passageway member between the adjacent car bodies, a passageway drive mechanism, said mechanism comprising fixed racks mounted on each one of the adjacent car bodies engaging a pinion member rotatably mounted on the underside of said passageway member.

4. In an articulated car unit, a passageway member pivotally supported between the adjacent car bodies, a passageway drive mechanism, said mechanism comprising fixed racks mounted on each one of the adjacent ends of the adjacent car bodies and engaging a pinion member rotatably mounted on the underside of said passageway member.

5. In an articulated car unit, a hollow cylindrical passageway member pivotally supported between and extending into the adjacent ends of the adjacent car bodies, a passageway drive mechanism, said mechanism comprising members mounted on the adjacent ends of both adjacent car bodies engaging a member pivotally mounted on the underside of said passageway member.

6. The combination in an articulated car unit of a passageway member between the adjacent car bodies and a passageway drive mechanism, said mechanism comprising members mounted on adjacent ends of both adjacent car bodies engaging a member pivotally mounted on the underside of said passageway member.

7. In an articulated car unit, adjacent ends of adjacent car bodies supported on a common truck, a passageway member pivotally supported between said car bodies, a passageway drive mechanism, said mechanism comprising members mounted on the adjacent ends of both adjacent car bodies engaging a member rotatably mounted on said passageway member.

In testimony whereof I affix my signature.

ALFRED K. PEHRSON.